US011917947B2

(12) United States Patent
Mitsui et al.

(10) Patent No.: US 11,917,947 B2
(45) Date of Patent: Mar. 5, 2024

(54) THRESHING CYLINDER

(71) Applicant: Kubota Corporation, Osaka (JP)

(72) Inventors: Takafumi Mitsui, Sakai (JP); Fumisato Nakagawa, Sakai (JP); Toshinari Nishimura, Sakai (JP); Tsuyoshi Kumatori, Sakai (JP)

(73) Assignee: Kubota Corporation, Osaka (JP)

( * ) Notice: Subject to any disclaimer, the term of this patent is extended or adjusted under 35 U.S.C. 154(b) by 597 days.

(21) Appl. No.: 17/055,258

(22) PCT Filed: May 15, 2019

(86) PCT No.: PCT/JP2019/019273
§ 371 (c)(1),
(2) Date: Nov. 13, 2020

(87) PCT Pub. No.: WO2019/230397
PCT Pub. Date: Dec. 5, 2019

(65) Prior Publication Data
US 2021/0212260 A1   Jul. 15, 2021

(30) Foreign Application Priority Data

May 31, 2018 (JP) ................................ 2018-105195
May 31, 2018 (JP) ................................ 2018-105196

(51) Int. Cl.
  *A01F 12/22*  (2006.01)
  *A01F 7/02*   (2006.01)
  (Continued)

(52) U.S. Cl.
  CPC ............... *A01F 12/22* (2013.01); *A01F 7/02* (2013.01); *A01D 41/02* (2013.01); *A01D 89/002* (2013.01);
  (Continued)

(58) Field of Classification Search
CPC .. A01F 12/22; A01F 7/02; A01F 12/10; A01F 12/20; A01F 12/32; A01F 12/185; A01D 41/02; A01D 89/002
See application file for complete search history.

(56) References Cited

U.S. PATENT DOCUMENTS 529,214 A * 11/1894 Swenson ................. A01F 12/20
                                                    460/71
1,160,535 A * 11/1915 Selk ........................ A01F 12/22
                                                    460/122

FOREIGN PATENT DOCUMENTS

CN           1754421 A        4/2006
CN           1895019 A  *     1/2007  ............. A01F 12/22
                       (Continued)

*Primary Examiner* — Arpad Fabian-Kovacs
(74) *Attorney, Agent, or Firm* — The Webb Law Firm

(57) ABSTRACT

Provided is a threshing cylinder with a threshing processing section provided on the rear side of a raking section. In the threshing processing section, a front support member, an intermediate support member, and a rear support member are supported by a threshing cylinder support shaft. A plurality of front-side divided threshing teeth support members are supported by the front support member and the intermediate support member in a state in which the front-side divided threshing teeth support members are arranged at the same arrangement pitch in the circumferential direction of the threshing processing section. A plurality of rear-side divided threshing teeth support members are supported by the intermediate support member and the rear support member in a state in which the rear-side divided threshing teeth support members are arranged at the same arrangement pitch in the circumferential direction of the threshing processing section.

9 Claims, 9 Drawing Sheets

(51) Int. Cl.
  *A01D 41/02*    (2006.01)
  *A01D 89/00*    (2006.01)
  *A01F 12/10*    (2006.01)
  *A01F 12/20*    (2006.01)
  *A01F 12/32*    (2006.01)

(52) U.S. Cl.
  CPC .............. *A01F 12/10* (2013.01); *A01F 12/20* (2013.01); *A01F 12/32* (2013.01)

(56) References Cited

FOREIGN PATENT DOCUMENTS

| | | | | |
|---|---|---|---|---|
| CN | 202310638 U | * | 7/2012 | ............. A01F 12/22 |
| CN | 104488456 A |   | 4/2015 | |
| CN | 105660057 A |   | 6/2016 | |
| CN | 105723919 A | * | 7/2016 | ............. A01D 41/12 |
| CN | 105993413 A | * | 10/2016 | ............. A01F 12/22 |
| CN | 107371642 A | * | 11/2017 | ............. A01F 12/22 |
| CN | 108142107 A | * | 6/2018 | ............. A01F 12/10 |
| CN | 108271538 A | * | 7/2018 | ............. A01F 11/00 |
| CN | 111713270 A | * | 9/2020 | ............. A01F 12/20 |
| CN | 113575140 A | * | 11/2021 | ............. A01F 12/22 |
| EP | 2724607 A1 | * | 4/2014 | ........... A01D 89/002 |
| JP | 200675128 A |   | 3/2006 | |
| JP | 2009207360 A |   | 9/2009 | |
| JP | 2009219443 A |   | 10/2009 | |
| JP | 4488445 B2 | * | 6/2010 | ............. A01D 41/02 |
| JP | 2011182653 A |   | 9/2011 | |
| JP | 2011182653 A | * | 9/2011 | ............. A01F 12/22 |
| JP | 2012254045 A | * | 12/2012 | ............. A01F 12/22 |
| JP | 2014014331 A | * | 1/2014 | ............. A01F 12/32 |
| JP | 2015100272 A |   | 6/2015 | |
| JP | 2015188435 A |   | 11/2015 | |
| JP | 2016154512 A |   | 9/2016 | |
| JP | 2016202010 A |   | 12/2016 | |
| JP | 2017176052 A |   | 10/2017 | |
| JP | 2019208389 A | * | 12/2019 | ............. A01F 12/18 |
| KR | 1020060051188 A |   | 5/2006 | |
| WO | 2010047430 A1 |   | 4/2010 | |
| WO | 2012108459 A1 |   | 8/2012 | |
| WO | WO-2016158078 A1 | * | 10/2016 | ............. A01F 12/22 |

* cited by examiner

THRESHING CYLINDER

CROSS-REFERENCE TO RELATED APPLICATIONS

This application is the United States national phase of International Application No. PCT/JP2019/019273 filed May 15, 2019, and claims priority to Japanese Patent Application Nos. 2018-105195 and 2018-105196, both filed May 31, 2018, the disclosures of which are hereby incorporated by reference in their entirety.

BACKGROUND OF THE INVENTION

1. Field of the Invention

The present invention relates to a threshing cylinder.

2. Description of Related Art

Conventionally, threshing cylinders are available that each include: a threshing cylinder support shaft that is rotatably provided in a threshing chamber into which the entirety of harvested crops is fed, so as to be oriented along a front-rear direction of the threshing chamber; a raking section that is supported by a front portion of the threshing cylinder support shaft and that rakes the fed crops toward a rear of the threshing chamber; and a threshing processing section that is supported by a portion of the threshing cylinder support shaft located rearward of the raking section and that performs threshing processing on the crops raked by the raking section.

Among the above-described threshing cylinders, a threshing cylinder configured as a so-called bar-shaped threshing cylinder is available as described in JP 2017-176052A, for example.

(1) In the threshing processing section, a plurality of bar-shaped threshing teeth support members extending along the threshing cylinder support shaft are provided in a state in which the threshing teeth support members are spaced in the circumferential direction of the threshing processing section. A plurality of bar-shaped threshing teeth are supported by each of the plurality of threshing teeth support members in a state in which the threshing teeth protrude outward in the radial direction of the threshing processing section from the threshing teeth support member and are spaced in a direction extending along the threshing cylinder support shaft. This threshing cylinder is configured to enable threshing objects supplied from a raking section to be threshed by hitting with the threshing teeth support members and the threshing teeth, and combing with the threshing teeth.

(2) In addition, the threshing processing section includes a front support member that is supported by the threshing cylinder support shaft, a rear support member that is supported by a portion of the threshing cylinder support shaft located rearward of the front support member, and a disk-like plate-shaped member as an intermediate support member that is supported by a portion of the threshing cylinder support shaft located between the front support member and the rear support member, and the plurality of bar-shaped threshing teeth support members extending along the threshing cylinder support shaft are supported by the front support member, the intermediate support member, and the rear support member in a state in which the threshing teeth support members are spaced in the circumferential direction of the threshing processing section. A plurality of bar-shaped threshing teeth are supported by each of the plurality of threshing teeth support members in a state in which the threshing teeth protrude outward in the radial direction of the threshing processing section from the threshing teeth support member and are spaced in a direction extending along the threshing cylinder support shaft.

SUMMARY OF THE INVENTION

A problem corresponding to the background art described above is as follows.

In the case of a threshing cylinder obtained based on the conventional technique, each of the threshing teeth support members is formed by a single threshing teeth support member from the front end to the rear end of the threshing teeth support member. Accordingly, when a strong threshing reaction force acts on the threshing cylinder, the threshing teeth support members are flexed or deformed, thus causing a threshing failure. In order to prevent a threshing failure, it is necessary to increase the rigidity of the threshing cylinder. However, increasing the rigidity of the threshing cylinder results in an increase in the weight thereof. The longer the front-to-rear length of the threshing cylinder is, the longer the length of the threshing teeth support member becomes. Therefore, it is necessary to further increase the rigidity, resulting in a further increase in the weight of the cylinder.

The present invention provides a threshing cylinder with high rigidity, while suppressing an increase in the weight of the threshing cylinder and allowing the threshing cylinder to be easily produced.

A problem corresponding to the background art described above is as follows.

When assembling a threshing cylinder obtained based on the conventional technique, the entire intermediate support member needs to be mounted at once, and therefore the intermediate support member is difficult to handle. Thus, it requires time and effort to assemble the threshing cylinder.

The present invention provides a threshing cylinder that can be easily assembled despite being a bar-shaped threshing cylinder.

A threshing cylinder according to the present invention includes: a threshing cylinder support shaft that is rotatably provided in a threshing chamber into which the entirety of harvested crops is fed, so as to be oriented along a front-rear direction of the threshing chamber; a raking section that is supported by a front portion of the threshing cylinder support shaft and that rakes the fed crops toward a rear of the threshing chamber; and a threshing processing section that is supported by a portion of the threshing cylinder support shaft located rearward of the raking section and that performs threshing processing on the crops raked by the raking section, wherein the threshing processing section includes: a front support member that is supported by the threshing cylinder support shaft; a rear support member that is supported by a portion of the threshing cylinder support shaft located rearward of the front support member; an intermediate support member that is supported by a portion of the threshing cylinder support shaft located between the front support member and the rear support member; a plurality of bar-shaped threshing teeth support members that are supported by the front support member, the intermediate support member, and the rear support member in a state in which the threshing teeth support members extend along the threshing cylinder support shaft and are spaced in a circumferential direction of the threshing processing section; and a plurality of bar-shaped threshing teeth that are supported by each of the plurality of threshing teeth support members in a state in which the threshing teeth protrude outward in a radial direction of the threshing processing section from the threshing teeth support member and are spaced in a direction extending along the threshing cylinder support shaft, each of the plurality of threshing teeth support members is divided into a front-side divided threshing teeth support member located forward of the intermediate support member, and a rear-side divided threshing teeth support member located rearward of the intermediate support member, and, in a circumferential direction of the threshing processing section, the plurality of front-side divided threshing teeth support members have the same arrangement pitch, the plurality of rear-side divided threshing teeth support members have the same arrangement pitch, and an arrangement of the front-side divided threshing teeth support members and an arrangement of the rear-side divided threshing teeth support members are different.

With this configuration, the length of each of the front-side divided threshing teeth support members and the rear-side divided threshing teeth support members is shorter than the overall length of the threshing teeth support member. Also, the front-side divided threshing teeth support members are supported by the front support member and the intermediate support member at the front and rear end portions thereof, and the rear-side divided threshing teeth support members are supported by the intermediate support member and the rear support member at the front and rear end portions thereof. Accordingly, even if the threshing cylinder as a whole is configured to have the same level of strength as that of a threshing teeth support member entirely formed as a single member, the overall weight of the threshing cylinder can be lower than the weight of a threshing cylinder including a threshing teeth support member entirely formed as a single member.

The portion of the intermediate support member for supporting the front-side divided threshing teeth support members and the portion of the intermediate support member for supporting the rear-side divided threshing teeth support members are positionally displaced in the circumferential direction of the threshing processing section. Accordingly, the operation for coupling each of the front-side divided threshing teeth support members and the rear-side divided threshing teeth support members to the intermediate support member can be easily performed.

Accordingly, it is possible to obtain a threshing cylinder with high rigidity, while suppressing an increase in the weight of the threshing cylinder and allowing the threshing cylinder to be easily produced.

Also, the front-side divided threshing teeth support members and the rear-side divided threshing teeth support members are positionally displaced in the circumferential direction of the threshing processing section. Accordingly, when threshing objects have moved from the portion of the threshing processing section that has the front-side divided threshing teeth support members to the portion thereof that has the rear-side divided threshing teeth support members, the threshing objects are easily subjected to the hitting and the combing action by the rear-side divided threshing teeth support members and the threshing teeth supported by the rear-side divided threshing teeth support members, and are thus can be effectively threshed.

In the present invention, it is preferable that the front-side divided threshing teeth support members and the rear-side divided threshing teeth support members have an equal length in a front-rear direction of the threshing cylinder, and the front-side divided threshing teeth support members and the rear-side divided threshing teeth support members are interchangeable.

With this configuration, for example, when the threshing teeth supported by the front-side divided threshing teeth support members have been more significantly worn than the threshing teeth supported by the rear-side divided threshing teeth support members, it is possible to take an emergency measure by interchanging the front-side divided threshing teeth support members and the rear-side divided threshing teeth support members, which is convenient.

In the present invention, it is preferable that the intermediate support member includes an inner circumferential-side support member that is welded to the threshing cylinder support shaft, and an outer circumferential-side support member that is removably supported by the inner circumferential-side support member and that supports the threshing teeth support members.

With this configuration, it is possible to provide an advantage such as being able to attach the intermediate support member to the threshing cylinder support shaft, separately as the inner circumferential-side support member and the outer circumferential-side support member. Furthermore, the intermediate support member is firmly supported by the threshing cylinder support shaft as a result of the inner circumferential-side support member being welded to the threshing cylinder support shaft.

In the present invention, it is preferable that, in the intermediate support member, a support section that supports the outer circumferential-side support member is provided at an outer circumferential side portion of the inner circumferential-side support member, a coupling section that is coupled to the threshing cylinder support shaft by welding is provided at an inner circumferential side portion of the inner circumferential-side support member, and the coupling section is formed in a shape expanding from the support section toward two welded portions that are separated from each other in a direction extending along the threshing cylinder support shaft.

With this configuration, the inner circumferential-side support member is coupled to the threshing cylinder support shaft over a wide range in the axial direction of the threshing cylinder. Accordingly, the intermediate support member is more firmly supported by the threshing cylinder support shaft.

In the present invention, it is preferable that a support section that supports the outer circumferential-side support member is provided at an outer circumferential side portion of the inner circumferential-side support member, the outer circumferential-side support member has a through-hole through which the threshing cylinder support shaft and the inner circumferential-side support member are passed, an outer circumferential shape of the inner circumferential-side support member and a shape of the through-hole are formed in non-perfect circular shapes similar to each other, and a fixed section that is fixed to the support section is provided at a portion of the outer circumferential-side support member that overlaps the support section in a state in which the inner circumferential-side support member is passed through the through-hole, and the inner circumferential-side support member and the outer circumferential-side support member are rotated relative to each other.

With this configuration, in the case of removing the outer circumferential-side support member from the threshing cylinder support shaft, when the outer circumferential-side support member and the inner circumferential-side support member for which the fixation to the support section has been removed are rotated relative to each other so as to remove the overlapping between the support section and the fixed section, the inner circumferential-side support member is passed through the through-hole of the outer circumferential-side support member by moving the outer circumferential-side support member and the inner circumferential-side support member relative to each other in a direction extending along the threshing cylinder support shaft, and thus can be easily removed. In the case of attaching the outer circumferential-side support member to the threshing cylinder support shaft, when the outer circumferential-side support member and the inner circumferential-side support member are moved relative to each other in the direction extending along the threshing cylinder support shaft so as to pass the inner circumferential-side support member through the through-hole of the outer circumferential-side support member, the support section and the fixed section are caused to overlap each other by rotating the outer circumferential-side support member and the inner circumferential-side support member relative to each other, and thus the fixed section can be fixed and easily attached to the support section.

In the present invention, it is preferable that, in the front support member, the intermediate support member, and the rear support member, the outer circumferential-side support member is configured to be able to be divided in the radial direction of the threshing processing section.

With this configuration, in each of the front support member, the intermediate support member, and the rear support member, the divided outer circumferential-side support members can be separately attached to the inner circumferential-side support member or removed from the inner circumferential-side support member when the outer circumferential-side support member is removed from or attached to the threshing cylinder support shaft, and thus removal and attachment can be easily performed.

In the present invention, it is preferable that an outer diameter of the rear support member is smaller than an outer diameter of the intermediate support member.

With this configuration, the opening of a dust discharge port formed at a rear portion of the threshing chamber can be made wide due to a small outer diameter of the rear support member, and it is therefore possible to smoothly discharge threshing waste dust.

(2) Solving means corresponding to the problem (2) is as follows.

A threshing cylinder according to the present invention includes: a threshing cylinder support shaft that is rotatably provided in a threshing chamber into which the entirety of harvested crops is fed, so as to be oriented along a front-rear direction of the threshing chamber; a raking section that is supported by a front portion of the threshing cylinder support shaft and that rakes the fed crops toward a rear of the threshing chamber; and a threshing processing section that is supported by a portion of the threshing cylinder support shaft located rearward of the raking section and that performs threshing processing on the crops raked by the raking section, wherein the threshing processing section includes: a front support member that is supported by the threshing cylinder support shaft; a rear support member that is supported by a portion of the threshing cylinder support shaft located rearward of the front support member; an intermediate support member that is supported by a portion of the threshing cylinder support shaft located between the front support member and the rear support member; a plurality of bar-shaped threshing teeth support members that are supported by the front support member, the intermediate support member, and the rear support member in a state in which the threshing teeth support members extend along the threshing cylinder support shaft and are spaced in a circumferential direction of the threshing processing section; and a plurality of bar-shaped threshing teeth that are supported by each of the plurality of threshing teeth support members in a state in which the threshing teeth protrude outward in a radial direction of the threshing processing section from the threshing teeth support member and are spaced in a direction extending along the threshing cylinder support shaft, and the intermediate support member includes an inner circumferential-side support member that is supported by the threshing cylinder support shaft, and an outer circumferential-side support member that is removably supported by the inner circumferential-side support member and that supports the threshing teeth support members.

With this configuration, the intermediate support member can be handled and mounted, separately as the inner circumferential-side support member and the outer circumferential-side support member.

Accordingly, although the threshing cylinder includes a plurality of threshing teeth support members supported by the front support member, the intermediate support member, and the rear support member, and a plurality of threshing teeth supported by each of the plurality of threshing teeth support members, and constitutes a bar-shaped threshing cylinder, the threshing cylinder can be efficiently assembled as compared with a threshing cylinder configured such that the entire intermediate support member is mounted at once.

In the present invention, it is preferable that a support section that supports the outer circumferential-side support member is provided at an outer circumferential side portion of the inner circumferential-side support member, and a coupling section that is coupled to the threshing cylinder support shaft by welding is provided at an inner circumferential side portion of the inner circumferential-side support member.

With this configuration, the inner circumferential-side support member is firmly fixed to the threshing cylinder support shaft by welding. Accordingly, the intermediate support member is firmly supported by the threshing cylinder support shaft despite being divided into the inner circumferential-side support member and the outer circumferential-side support member.

In the present invention, it is preferable that the coupling section is formed in a shape expanding from the support section toward two welded portions that are separated from each other in a direction extending along an axis of the threshing cylinder support shaft.

With this configuration, the inner circumferential-side support member is coupled to the threshing cylinder support shaft over a wide range in the axial direction of the threshing cylinder. Accordingly, the intermediate support member is more firmly supported by the threshing cylinder support shaft.

In the present invention, it is preferable that a plurality of the intermediate support members are provided.

With this configuration, the supported span of the threshing teeth support members by the intermediate support member is narrowed, and thus the threshing teeth support members are firmly supported against a strong threshing reaction force.

In the present invention, it is preferable that a support section that removably supports the outer circumferential-side support member is provided at an outer circumferential side portion of the inner circumferential-side support member, the outer circumferential-side support member has a through-hole through which the threshing cylinder support shaft and the inner circumferential-side support member are passed, an outer circumferential shape of the inner circumferential-side support member and a shape of the through-hole are formed in non-perfect circular shapes similar to each other, and a fixed section that is fixed to the support section is provided at a portion of the outer circumferential-side support member that overlaps the support section in a state in which the inner circumferential-side support member is passed through the through-hole, and the inner circumferential-side support member and the outer circumferential-side support member are rotated relative to each other.

With this configuration, in the case of removing the outer circumferential-side support member from the threshing cylinder support shaft, when the outer circumferential-side support member and the inner circumferential-side support member for which the fixation to the support section has been removed are rotated relative to each other so as to remove the overlapping between the support section and the fixed section, the inner circumferential-side support member is passed through the through-hole of the outer circumferential-side support member by moving the outer circumferential-side support member and the inner circumferential-side support member relative to each other in a direction extending along the threshing cylinder support shaft, and thus can be easily removed. In the case of attaching the outer circumferential-side support member to the threshing cylinder support shaft, when the outer circumferential-side support member and the inner circumferential-side support member are moved relative to each other in the direction extending along the threshing cylinder support shaft so as to pass the inner circumferential-side support member through the through-hole of the outer circumferential-side support member, the support section and the fixed section are caused to overlap each other by rotating the outer circumferential-side support member and the inner circumferential-side support member relative to each other, and thus the fixed section can be fixed and easily attached to the support section.

In the present invention, it is preferable that the outer circumferential-side support member is configured to be able to be divided in the radial direction of the threshing processing section.

With this configuration, the divided outer circumferential-side support members can be separately attached to the inner circumferential-side support member or removed from the inner circumferential-side support member when the outer circumferential-side support member is removed from or attached to the threshing cylinder support shaft, and thus removal and attachment can be easily performed.

In the present invention, it is preferable that each of the plurality of threshing teeth support members is divided into divided threshing teeth support members at a position corresponding to the intermediate support member.

With this configuration, the length of each of the divided threshing teeth support members is shorter than the overall length of the threshing teeth support members, and the divided threshing teeth support members are supported by the intermediate support member, the front support member, the rear support member, and so forth at the front and rear end portions thereof. Accordingly, even if the threshing cylinder as a whole is configured to have the same level of strength as that of a threshing teeth support member entirely formed as a single member, the overall weight of the threshing cylinder can be lower than the weight of a threshing cylinder including a threshing teeth support member entirely formed as a single member. That is, it is possible to obtain a threshing cylinder with high rigidity while suppressing an increase in the weight of the threshing cylinder.

In the present invention, it is preferable that a coupling bracket is provided at an end portion of each of the plurality of divided threshing teeth support members that corresponds to the intermediate support member, the plurality of divided threshing teeth support members are arranged linearly so as to be located on the same axis, and, in a state in which the intermediate support member is sandwiched between the coupling brackets at the end portions of the divided threshing teeth support members that are adjacent to each other in a front-rear direction, the two coupling brackets are fastened together and coupled to the intermediate support member.

Even if an arrangement configuration is adopted in which the front-side divided threshing teeth support members and the rear-side threshing teeth support members are linearly arranged, the operation of coupling the front-side divided threshing teeth support members and the rear-side threshing teeth support members to the intermediate support member can be facilitated by fastening together and coupling the coupling brackets of the front-side divided threshing teeth support members and the coupling brackets of the rear-side threshing teeth support members to the intermediate support member. Accordingly, it is possible to adopt a configuration in which the threshing teeth support member is divided in the front-rear direction in order to suppress an increase in the weight of the threshing cylinder and increase the rigidity of the threshing cylinder, while linearly arranging the front and rear divided threshing teeth support members.

DETAILED DESCRIPTION OF PREFERRED EMBODIMENTS

Hereinafter, an exemplary embodiment of the present invention will be described with reference to the drawings.

Figure 1:
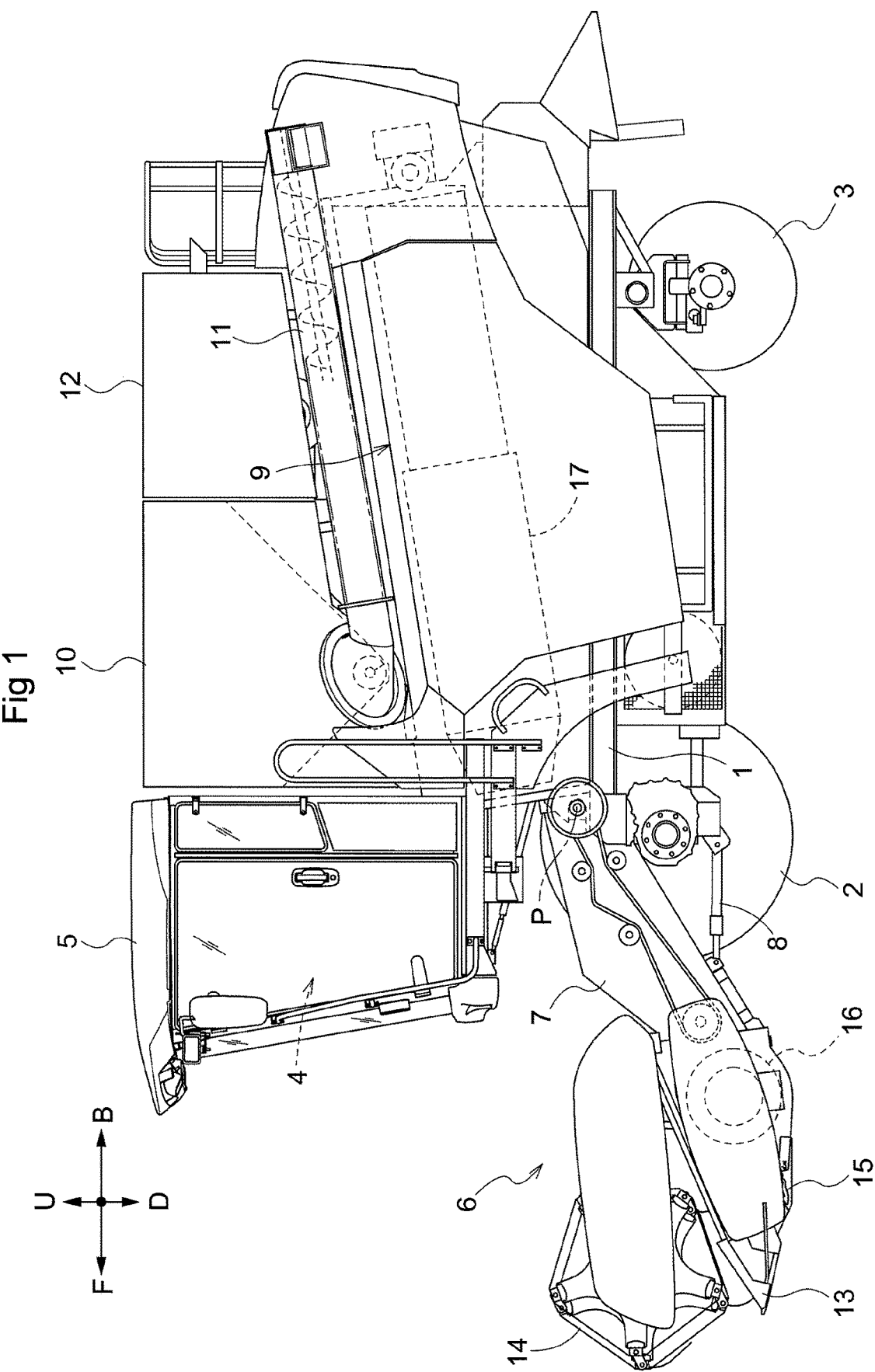
FIG. 1 is a left side view showing the entirety of a combine.

Note that in the following description, regarding the body of a normal-type combine, the direction of the arrow F shown in FIG. 1 is "forward direction of the body", the direction of the arrow B is "backward direction of the body", the direction of the arrow U is "upward direction of the body", and the direction of the arrow D is "downward direction of the body".

Regarding Overall Configuration of Combine:

As shown in FIG. 1, a normal-type combine includes a body including a body frame 1, a pair of left and right front wheels 2 equipped at a front portion of the body frame 1 so as to be able to be driven, and a pair of left and right rear wheels 3 equipped at a rear portion of the body frame 1 so as to be able to be steered. A boarding and driving section 4 is formed at the front portion of the body. The boarding and driving section 4 includes a cabin 5 that covers the boarding space. A reaping and transporting section 6 that reaps and transports culms of crops such as paddy rice, wheat, or colza located in front of the body during working and traveling is coupled to a front end portion of the body frame 1. The reaping and transporting section 6 is coupled so as to be able to be pivoted up and down with an elevation axis P extending laterally relative to the body as a fulcrum. The up and down pivoting of the reaping and transporting section 6 is performed by extending and contracting operation of a hydraulic elevation cylinder 8 provided spanning the body frame 1 and a feeder 7. A threshing apparatus 9 that receives the reaped culms transported by the reaping and transporting section 6 as materials to be threshed, then threshes the reaped culms, and performs sorting processing on the processed materials that have been threshed is provided at a rear portion of the body frame 1. A grain tank 10 for collecting and accumulating singulated grains transported from the threshing apparatus 9 is provided above the front portion of the threshing apparatus 9. A screw conveyor 11 that discharges the accumulated grains is connected to a lower portion of the grain tank 10. A prime mover section 12 including an engine is formed above a rear portion of the threshing apparatus 9.

Regarding Configuration of Reaping and Transporting Section 6:

As the body travels, unreaped culms are divided, by left and right dividers 13, into culms to be harvested and culms not to be harvested in the reaping and transporting section 6. In addition, the tip-side portions of the culms to be harvested are raked downward by a rotary reel 14 provided above the front portion of the reaping and transporting section 6. The bases of the raked culms are cut by a clipper-type reaping device 15, whereby the culms to be harvested are reaped. Then, the reaped culms are gathered at a front-side portion of the feeder 7 by a crossfeed auger 16 provided behind the reaping device 15. The entire gathered reaped culms, from their bases to tips, are fed into the threshing apparatus 9 by the feeder 7.

Regarding Configuration of Threshing Apparatus 9:

In describing the threshing apparatus 9 and a threshing cylinder 17, the processing starting end side [culm feeding side (the left side on the plane of paper in FIG. 2)] of the threshing apparatus 9 and the threshing cylinder 17 is referred to as "front", and the processing terminal side [the culm discharging side (the right side on the plane of paper in FIG. 2)] of the threshing apparatus 9 and the threshing cylinder 17 is referred to as "rear".

Figure 2:
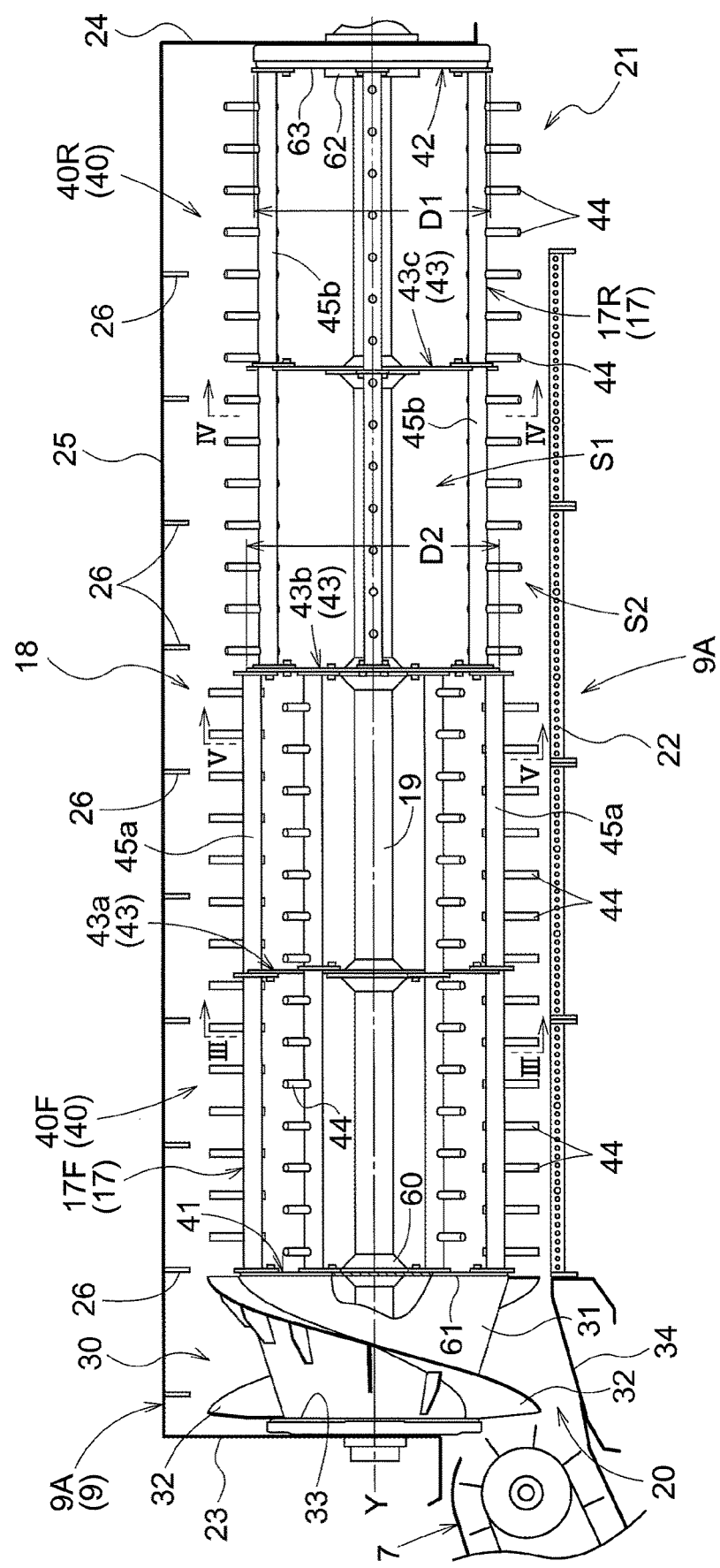
FIG. 2 is a longitudinal sectional side view showing a threshing section.

As shown in FIG. 2, the threshing apparatus 9 includes a threshing section 9A that handles, as threshing objects, reaped culms as crops fed by the feeder 7, and threshes the threshing objects.

Although not shown, a sorting section that performs sorting processing on the threshing objects that have been threshed is provided below the threshing section 9A. In the threshing apparatus 9, the threshing direction in the threshing section 9A is set to coincide with the front-rear direction of the body, and the upstream side of the threshing direction is set to be located on the front side of the body.

As shown in FIG. 2, the threshing section 9A includes a threshing chamber 18 formed in an upper portion of the threshing apparatus 9. The threshing chamber 18 is provided with a threshing cylinder 17. The threshing cylinder 17 is rotationally driven in a clockwise direction R in a front view (see FIGS. 3, 4, and 5) with a threshing cylinder support shaft 19 as a rotation center Y. A supply port 20 that enables the threshing objects to be fed into the threshing chamber 18 is formed at a lower front portion of the threshing chamber 18. A dust discharge port 21 that enables threshing waste dust to be discharged to the outside of the threshing chamber is formed at a lower rear portion of the threshing chamber 18. A receiving net 22 is equipped in a region of the circumference of the threshing cylinder 17 located below the threshing cylinder 17.

The threshing chamber 18 is defined by a front support wall 23 and a rear support wall 24 that support the threshing cylinder 17, a top plate 25 provided above the threshing cylinder 17, the receiving net 22, and so forth. A plurality of dust sending valves 26 arranged in the front-rear direction of the threshing chamber 18 are provided on the inner side of the top plate 25. As shown in FIG. 2, the threshing cylinder 17 includes a raking section 30 provided at a front portion of the threshing cylinder 17, and a threshing processing section 40 provided at a portion of the threshing cylinder 17 on the rear side of the raking section 30.

In the threshing section 9A, the entire reaped culms, from their bases to tips, fed from the supply port 20 into the threshing chamber 18 by the feeder 7 are raked to the inner side of the threshing chamber 18 by the raking section 30 as threshing objects, which are then threshed by the threshing processing section 40 and the receiving net 22. The threshing objects that are to be threshed are provided with a turning force by the rotating threshing processing section 40 to collide with the dust sending valves 26, and are guided by the dust sending valves 26 so as to flow toward the rear of the threshing chamber 18. The threshing objects are threshed, while being transferred toward the rear of the threshing chamber 18 by the threshing processing section 40. The grains obtained by threshing leak down from the receiving net 22. Threshing waste culms, cut straws, and the like generated due to threshing are discharged from the dust discharge port 21 to the outside of the threshing chamber 18.

Regarding Configuration of Threshing Cylinder 17:

As shown in FIG. 2, the threshing cylinder 17 is provided in the threshing chamber 18 in an orientation extending along the front-rear direction of the threshing chamber 18, and includes a threshing cylinder support shaft 19 that is rotationally driven with the threshing cylinder axis as a rotation center Y, a raking section 30 that is supported by a front portion of the threshing cylinder support shaft 19, and a threshing processing section 40 that is supported at a portion of the threshing cylinder support shaft 19 located rearward of the raking section 30.

Regarding Configuration of Raking Section 30:

As shown in FIG. 2, the raking section 30 includes a base portion 31 whose diameter decreases toward the front end of the threshing cylinder 17, and helical vanes 32 provided around an outer circumferential portion of the base portion 31 in a state in which they are raised toward the outside of the base portion 31 from the outer circumferential portion of the base portion 31. Two helical vanes 32 are provided. The two helical vanes 32 are provided extending from a rear end portion to a front end portion of the base portion 31 in the form of double helices arranged so as to be spaced in the circumferential direction of the base portion 31

The base portion 31 is formed by a sheet metal member rolled into the shape of a truncated cone. A circular plate member 33 is coupled to a front end portion of the base portion 31 and the threshing cylinder support shaft 19 so as to span therebetween. A front support member 41 is coupled to a rear end portion of the base portion 31 and the threshing cylinder support shaft 19 so as to span therebetween. The base portion 31 is supported by the threshing cylinder support shaft 19 via the circular plate member 33 and the front support member 41.

In the raking section 30, the base portion 31 is driven by the threshing cylinder support shaft 19 via the circular plate member 33 and the front support member 41, and the two helical vanes 32 are rotationally driven with the threshing cylinder axis as a rotation center. The entire reaped culms, from their bases to tips, fed from the supply port 20 into the threshing chamber 18 by the feeder 7 are raked by the rotating helical vanes 32 toward the rear of the threshing chamber 18 along a guide bottom plate 34 (see FIG. 2).

Regarding Configuration of Threshing Processing Section 40:

As shown in FIG. 2, the threshing processing section 40 includes a front support member 41 that is supported in a relatively non-rotatable manner by a portion of the threshing cylinder support shaft 19 corresponding to the rear of the raking section 30, a rear support member 42 that is supported in a relatively non-rotatable manner by a portion of the threshing cylinder support shaft 19 located rearward of the front support member 41, and three intermediate support members 43 each of which is supported in a relatively non-rotatable manner by a portion of the threshing cylinder support shaft 19 located between the front support member 41 and the rear support member 42. The three intermediate support members 43 are arranged so as to be spaced in the front-rear direction of the threshing cylinder support shaft 19. An outer diameter D1 of the rear support member 42 is set to be smaller than an outer diameter D2 of the three intermediate support members 43. The dust discharge port 21 can be formed wider as compared with a case where the outer diameter D1 of the rear support member 42 is the same as the outer diameter D2 of the intermediate support member 43. In the following, the forwardmost intermediate support member 43 of the three intermediate support members 43 is referred to as a "first intermediate support member 43a", the middle intermediate support member 43 of the three intermediate support members 43 is referred to as a "second intermediate support member 43b", and the rearwardmost intermediate support member 43 of the three intermediate support members 43 is referred to as a "third intermediate support member 43c".

The threshing processing section 40 includes a front-side threshing processing section 40F including a plurality of (e.g., six) front-side divided threshing teeth support members 45a located forward of the second intermediate support member 43b, and a rear-side threshing processing section 40R including a plurality of (e.g., six) rear-side divided threshing teeth support members 45b located rearward of the second intermediate support member 43b. The front-side divided threshing teeth support member 45a and the rear-side divided threshing teeth support member 45b are obtained by dividing a single threshing teeth support member having a front-to-rear length spanning between the front support member 41 and the rear support member 42 into two in the front-rear direction at the position corresponding to the second intermediate support member 43b.

The front-side threshing processing section 40F is supported by the threshing cylinder support shaft 19, and includes a front-side threshing cylinder body 17F that is rotationally driven by the threshing cylinder support shaft 19. A plurality of bar-shaped threshing teeth 44 are provided on an outer circumferential surface of the front-side threshing cylinder body 17F as a front-side outer circumferential surface of the threshing cylinder 17. The plurality of threshing teeth 44 are provided in a state in which the threshing teeth 44 are arranged so as to be spaced in a direction extending along the threshing cylinder support shaft 19 and are arranged so as to be spaced in the circumferential direction of the threshing cylinder 17. Each threshing teeth 44 protrudes outward in the radial direction of the threshing cylinder from the outer circumferential surface of the front-side threshing cylinder body 17F.

Figure 3:
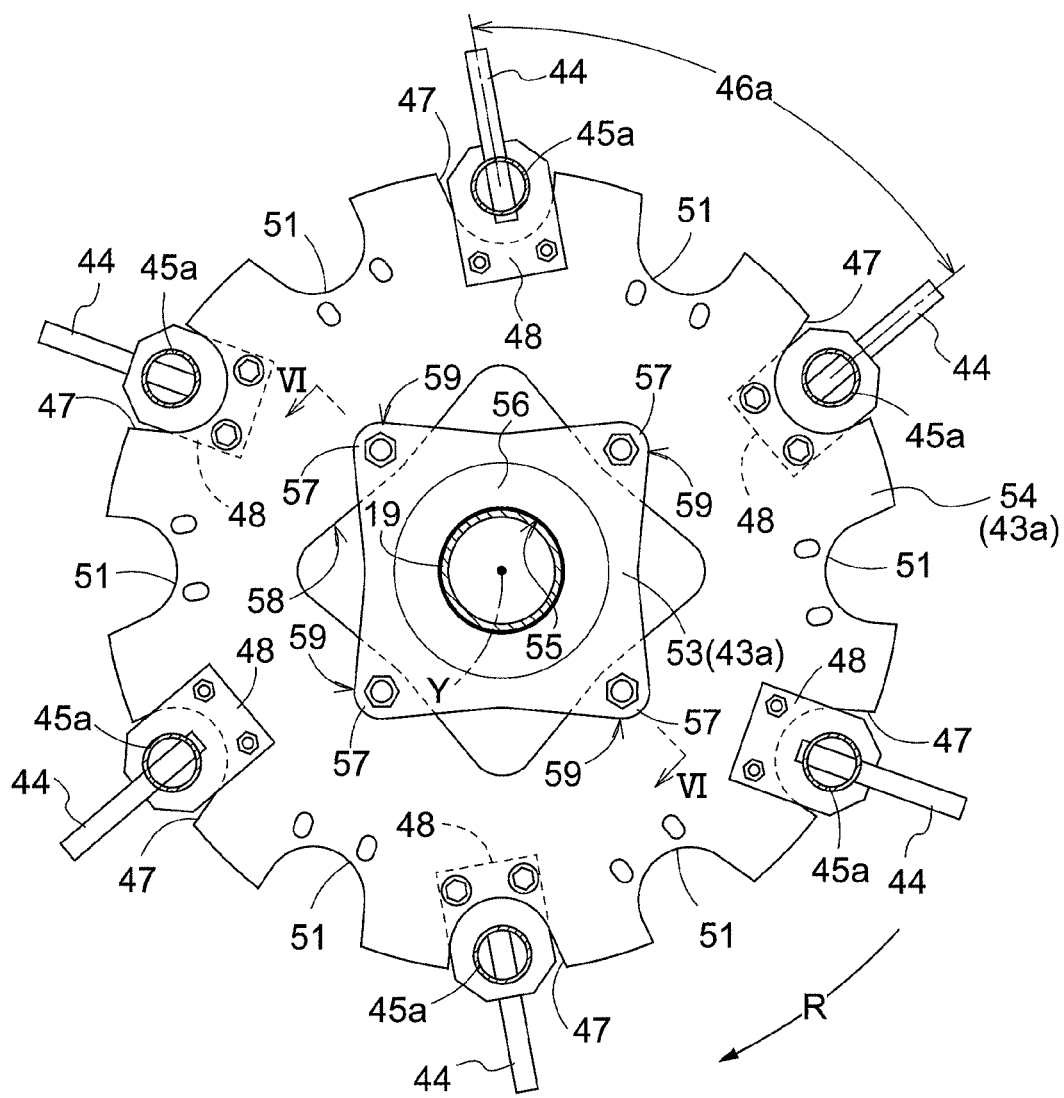
FIG. 3 is a cross-sectional view taken in the direction of the arrows III-III in FIG. 2.
Figure 5:
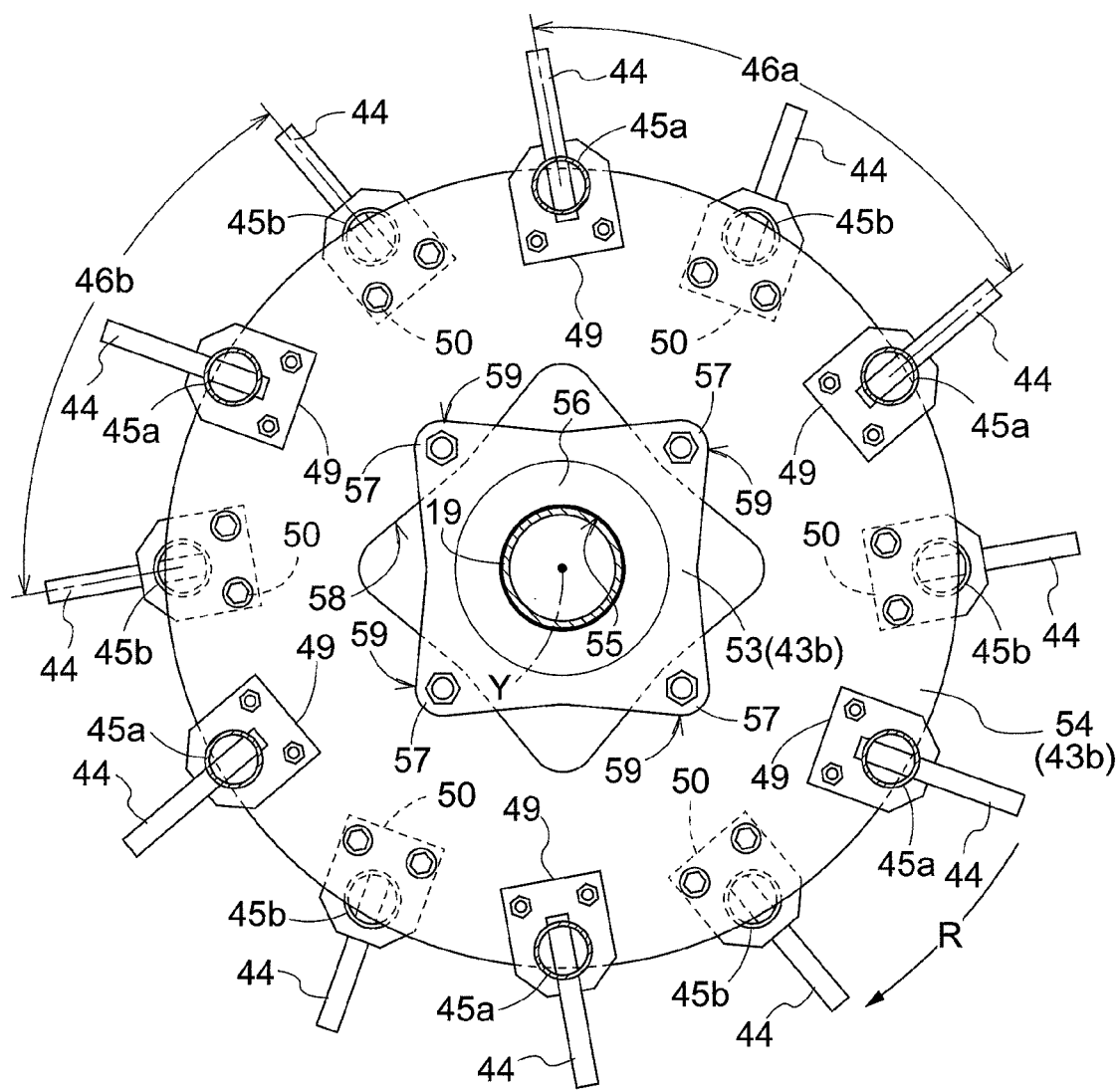
FIG. 5 is a cross-sectional view taken in the direction of the arrows V-V in FIG. 2.

As shown in FIGS. 2, 3, and 5, the front-side threshing cylinder body 17F includes six front-side divided threshing teeth support members 45a that are supported by the front support member 41, the first intermediate support member 43a, and the second intermediate support member 43b in a state in which the front-side divided threshing teeth support members 45a extend along the threshing cylinder support shaft 19 and are arranged so as to be spaced in the circumferential direction of the threshing processing section 40. As shown in FIGS. 3 and 5, the six front-side divided threshing teeth support members 45a are supported in a state in which the six front-side divided threshing teeth support members 45a have the same arrangement pitch 46a in the circumferential direction of the threshing processing section 40. That is, the six front-side divided threshing teeth support members 45a are arranged at equal intervals in the circumferential direction of the threshing processing section 40. As shown in FIG. 2, a plurality of bar-shaped threshing teeth 44 are supported by each of the six front-side divided threshing teeth support members 45a in a state in which the threshing teeth 44 are spaced in a direction extending along the threshing cylinder support shaft 19. As shown in FIGS. 3 and 5, the threshing teeth 44 of each of the front-side divided threshing teeth support members 45a protrude outward in the radial direction of the threshing processing section 40 from the front-side divided threshing teeth support member 45a.

The front end side of each of the front-side divided threshing teeth support members 45a is supported by an outer circumferential portion of the front support member 41, an intermediate portion of each of the front-side divided threshing teeth support members 45a is supported by an outer circumferential portion of the first intermediate support member 43a, and the rear end side of each of the front-side divided threshing teeth support members 45a is supported by an outer circumferential portion of the second intermediate support member 43b. Each of the front-side divided threshing teeth support members 45a is supported in a relatively non-rotatable manner by the threshing cylinder support shaft 19 via the front support member 41, the first intermediate support member 43a, and the second intermediate support member 43b. The cylindrical surface circumscribing the six front-side divided threshing teeth support members 45a serves as the outer circumferential surface of the front-side threshing cylinder body 17F.

Specifically, a front end portion of each front-side divided threshing teeth support member 45a is coupled to the rearward-facing side surface of the front support member 41 via a plate-shaped coupling member. As shown in FIG. 3, an intermediate portion of the front-side divided threshing teeth support member 45a is placed into a recessed portion 47 of the first intermediate support member 43a, and is coupled to the first intermediate support member 43a via a plate-shaped coupling member 48. The coupling member 48 and the front-side divided threshing teeth support member 45a are coupled in a state in which the coupling member 48 is slidably fitted onto the front-side divided threshing teeth support member 45a. The coupling member 48 and the first intermediate support member 43a are coupled using coupling bolts. As shown in FIG. 5, a rear end portion of the front-side divided threshing teeth support member 45a is coupled to the forward-facing side surface of the second intermediate support member 43b via a plate-shaped coupling member 49. The front-side divided threshing teeth support member 45a and the coupling member 49 are coupled by welding. The coupling member 49 and the second intermediate support member 43b are coupled using coupling bolts.

The rear-side threshing processing section 40R is supported by the threshing cylinder support shaft 19, and includes a rear-side threshing cylinder body 17R that is rotationally driven by the threshing cylinder support shaft 19. A plurality of bar-shaped threshing teeth 44 are provided on an outer circumferential surface of the rear-side threshing cylinder body 17R as a rear-side outer circumferential surface of the threshing cylinder 17 in a state in which the threshing teeth 44 are arranged so as to be spaced in a direction extending along the threshing cylinder support shaft 19 and are arranged so as to be spaced in the circumferential direction of the threshing cylinder 17. Each of the threshing teeth 44 protrudes outward in the radial direction of the threshing cylinder from the outer circumferential surface of the rear-side threshing cylinder body 17R.

Figure 4:
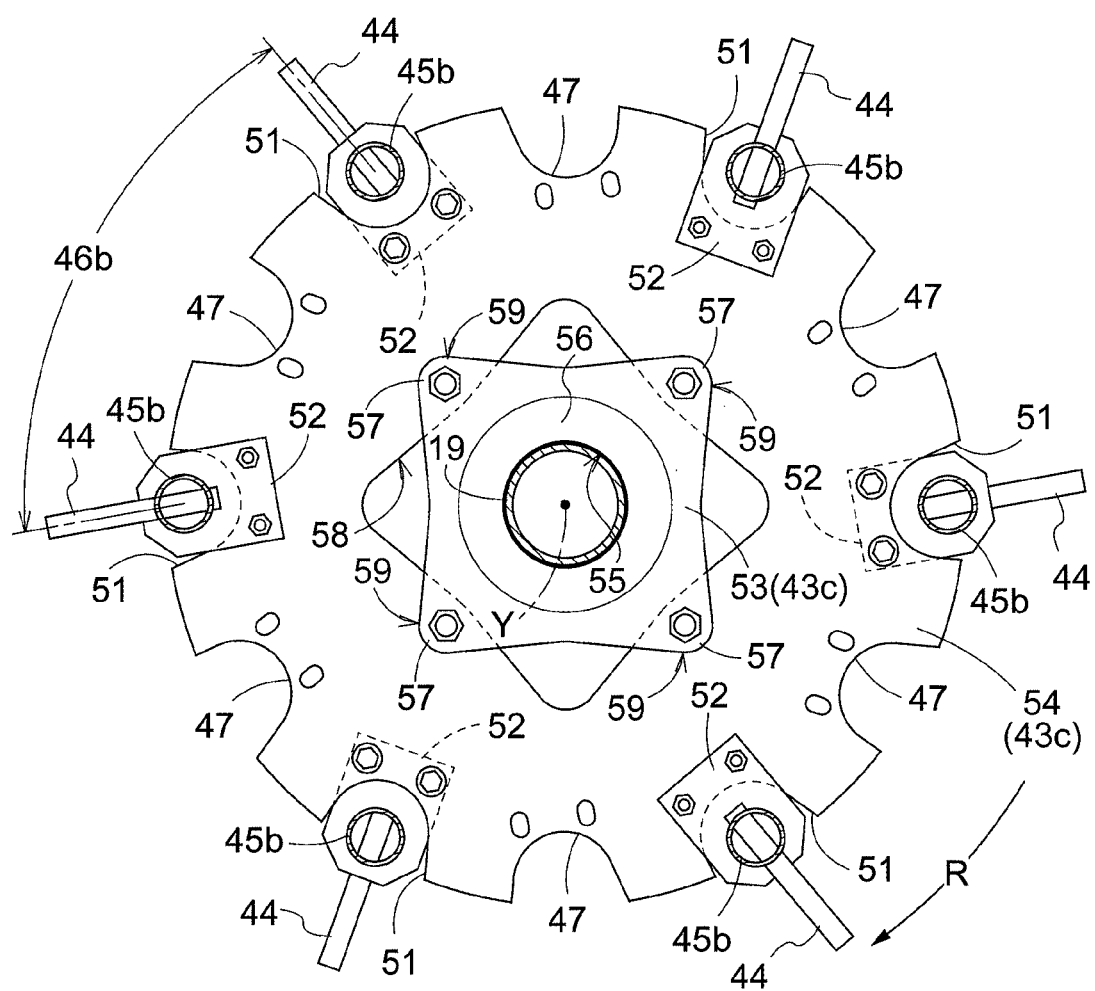
FIG. 4 is a cross-sectional view taken in the direction of the arrows IV-IV in FIG. 2.

As shown in FIGS. 2, 4, and 5, the rear-side threshing cylinder body 17R includes six bar-shaped rear-side divided threshing teeth support members 45b that are supported by the second intermediate support member 43b, the third intermediate support member 43c, and the rear support member 42 in a state in which the rear-side divided threshing teeth support members 45b extend along the threshing cylinder support shaft 19 and are arranged so as to be spaced in the circumferential direction of the threshing processing section 40. As shown in FIGS. 4 and 5, the six rear-side divided threshing teeth support members 45b are supported in a state in which the six rear-side divided threshing teeth support members 45b have the same arrangement pitch 46b in the circumferential direction of the threshing processing section 40. That is, the six rear-side divided threshing teeth support members 45b are arranged at equal intervals in the circumferential direction of the threshing processing section 40. As shown in FIG. 2, a plurality of bar-shaped threshing teeth 44 are supported by each of the six rear-side divided threshing teeth support members 45b in a state in which the threshing teeth 44 are spaced in a direction extending along the threshing cylinder support shaft 19. As shown in FIGS. 4 and 5, the threshing teeth 44 of each of the rear-side divided threshing teeth support members 45b protrude outward in the radial direction of the threshing processing section 40 from the rear-side divided threshing teeth support member 45b. In the present embodiment, the arrangement pitch 46a of the front-side divided threshing teeth support member 45a and the arrangement pitch 46b of the rear-side divided threshing teeth support member 45b are set to be equal. The present invention is not limited to this, and it is possible to adopt a configuration in which the arrangement pitch 46a of the front-side divided threshing teeth support member 45a and the arrangement pitch 46b of the rear-side divided threshing teeth support member 45b are different.

The front end side of each of the rear-side divided threshing teeth support members 45b is supported by an outer circumferential portion of the second intermediate support member 43b, an intermediated portion of each of the rear-side divided threshing teeth support members 45b is supported by an outer circumferential portion of the third intermediate support member 43c, and the rear end side of each of the rear-side divided threshing teeth support members 45b is supported by an outer circumferential portion of the rear support member 42. Each of the rear-side divided threshing teeth support members 45b is supported in a relatively non-rotatable manner by the threshing cylinder support shaft 19 via the second intermediate support member 43b, the third intermediate support member 43c, and the rear support member 42. The cylindrical surface circumscribing the six rear-side divided threshing teeth support members 45b serves as the outer circumferential surface of the rear-side threshing cylinder body 17R.

Specifically, as shown in FIG. 5, a front end portion of each rear-side divided threshing teeth support member 45b is coupled to the rearward-facing side surface of the second intermediate support member 43b via a plate-shaped coupling member 50. As shown in FIG. 4, an intermediated portion of the rear-side divided threshing teeth support member 45b is placed into a recessed portion 51 of the third intermediate support member 43c, and is coupled to the third intermediate support member 43c via a plate-shaped coupling member 52. The coupling member 52 and the rear-side divided threshing teeth support member 45b are coupled in a state in which the coupling member 52 is slidably fitted onto the rear-side divided threshing teeth support member 45b. The coupling member 52 and the third intermediate support member 43c are coupled using coupling bolts. A rear end portion of the rear-side divided threshing teeth support member 45b is coupled to the forward-facing side surface of the rear support member 42 via a plate-shaped coupling member. The rear-side divided threshing teeth support member 45b and the coupling member are coupled by welding. The coupling member and the rear support member 42 are coupled using coupling bolts.

The front-side divided threshing teeth support members 45a and the rear-side divided threshing teeth support members 45b are configured to have the same length in the front-rear direction. The front-side divided threshing teeth support members 45a and the rear-side divided threshing teeth support members 45b can be interchangeably attached to the threshing cylinder 17. That is, the front-side divided threshing teeth support members 45a can be supported by the second intermediate support member 43b, the third intermediate support member 43c, and the rear support member 42, in place of the rear-side divided threshing teeth support members 45b. The rear-side divided threshing teeth support members 45b can be supported by the front support member 41, the first intermediate support member 43a, and the second intermediate support member 43b, in place of the front-side divided threshing teeth support members 45a.

As shown in FIG. 5, the front-side divided threshing teeth support members 45a and the rear-side divided threshing teeth support members 45b are provided in the threshing cylinder 17 in a state in which the arrangement of the front-side divided threshing teeth support members 45a in the circumferential direction of the threshing processing section 40 and the arrangement of the rear-side divided threshing teeth support members 45b in the circumferential direction of the threshing processing section 40 are different. That is, in the circumferential direction of the threshing processing section 40, the front-side divided threshing teeth support members 45a and the rear-side divided threshing teeth support members 45b are positionally displaced from each other. In the present embodiment, as shown in FIG. 5, a configuration is adopted in which, as viewed in the front-rear direction of the threshing cylinder 17, the arrangement of the front-side divided threshing teeth support members 45a and the arrangement of the rear-side divided threshing teeth support members 45b are different in a state in which the interval (the interval on the downstream side in the direction of rotation) between a front-side divided threshing teeth support member 45a and a rear-side divided threshing teeth support member 45b located adjacent to the front-side divided threshing teeth support member 45a on the downstream side in the direction of rotation of the threshing cylinder is equal to the interval (the interval on the upstream side in the direction of rotation) between the front-side divided threshing teeth support member 45a and a rear-side divided threshing teeth support member 45b located adjacent to the front-side divided threshing teeth support member 45a on the upstream side in the direction of rotation of the threshing cylinder. Of the configurations according to the present invention, "a configuration in which the arrangement of the front-side divided threshing teeth support members 45a and the arrangement of the rear-side divided threshing teeth support members 45b are different" is not limited to a configuration in which the interval on the upstream side in the direction of rotation and the interval on the downstream side in the direction of rotation are equal, and also includes a configuration in which the interval on the upstream side in the direction of rotation and the interval on the downstream side in the direction of rotation are different.

In the present embodiment, six front-side divided threshing teeth support members 45a and six rear-side divided threshing teeth support members 45b are provided; however, five or less, or seven or more front-side divided threshing teeth support members 45a and five or less, or seven or more rear-side divided threshing teeth support members 45b may be provided. In the present embodiment, the front-side divided threshing teeth support members 45a and the rear-side divided threshing teeth support members 45b are each formed by a round pipe steel member. In addition to a round pipe steel member, a variety of bar-shaped members such as a round steel member, a square bar steel member, and a square pipe steel member may be used for the front-side divided threshing teeth support members 45a and the rear-side divided threshing teeth support members 45b. An angled member or a channel member may also be used for the front-side divided threshing teeth support members 45a and the rear-side divided threshing teeth support members 45b. In the present embodiment, the threshing teeth are each formed by a round steel member. In addition to a round steel member, a variety of bar-shaped members such as a square bar steel member, a round pipe member, and various pipe members may be used for the threshing teeth 44.

The threshing cylinder 17 is formed in the shape of a cage inside of which an internal space S1 (see FIG. 2) in communication with the threshing chamber 18 via the spaces between the front-side divided threshing teeth support members 45a and the spaces between the rear-side divided threshing teeth support members 45b is formed, and is configured to include a plurality of threshing teeth 44 protruding outward in the radial direction of the threshing cylinder from the outer circumferential surface of the threshing cylinder 17 in a state in which the threshing teeth 44 are aligned so as to be spaced in the circumferential direction of the threshing cylinder 17 and the processing direction, thus being formed as a so-called bar-shaped threshing cylinder.

Accordingly, the threshing cylinder 17 introduces the threshing objects supplied from the raking section 30 into the space between the threshing processing section 40 and the receiving net 22 by rotating with the threshing cylinder support shaft 19 in the processing direction as the rotation center Y. The threshing cylinder 17 threshes threshing objects located in a threshing processing space S2 (see FIG. 2) between the receiving net 22 and itself, for example, by hitting with the front-side divided threshing teeth support members 45a, the rear-side divided threshing teeth support members 45b, and the threshing teeth 44, and combing with the threshing teeth 44, and allows the entry of the processed materials resulting from the threshing into the internal space S1. While agitating the processed materials in the threshing processing space S2 and the processed materials in the internal space S1, the threshing cylinder 17 threshes these processed materials, for example, by hitting with the front-side divided threshing teeth support members 45a and the rear-side divided threshing teeth support members 45b, and the threshing teeth 44, and combing with the threshing teeth 44.

Regarding Configuration of Intermediate Support Member 43:

As shown in FIGS. 3 and 4, the first intermediate support member 43a and the third intermediate support member 43c are configured to have the same specifications. That is, recessed portions 47 into which the front-side divided threshing teeth support members 45a can be placed and recessed portions 51 into which the rear-side divided threshing teeth support members 45b can be placed are formed in each of the first intermediate support member 43a and the third intermediate support member 43c. The first intermediate support member 43a and the third intermediate support member 43c can be interchangeably supported by the threshing cylinder support shaft 19.

As shown in FIGS. 3, 4, and 5, each of the first intermediate support member 43a, the second intermediate support member 43b, and the third intermediate support member 43c includes an inner circumferential-side support member 53 and an outer circumferential-side support member 54. The inner circumferential-side support member 53 is supported by the threshing cylinder support shaft 19 at the central portion thereof, the outer circumferential-side support member 54 is supported by an outer circumferential portion of the inner circumferential-side support member 53 at the inner circumferential portion thereof, and the front-side divided threshing teeth support members 45a and the rear-side divided threshing teeth support members 45b are supported by an outer circumferential portion of the outer circumferential-side support member 54. The outer circumferential-side support member 54 is removably supported by the forward-facing side surface of the inner circumferential-side support member 53. Accordingly, each of the first intermediate support member 43a, the second intermediate support member 43b, and the third intermediate support member 43c is supported in a relatively non-rotatable manner by the threshing cylinder support shaft 19, and couples the front-side divided threshing teeth support members 45a and the rear-side divided threshing teeth support members 45b to the threshing cylinder support shaft 19 so as to enable rotational driving by the threshing cylinder support shaft 19.

Figure 6:
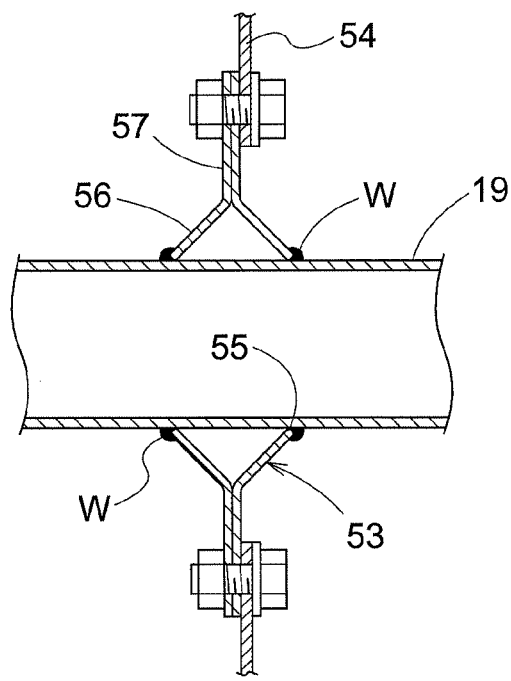
FIG. 6 is a cross-sectional view taken in the direction of the arrows VI-VI in FIG. 3.

Specifically, as shown in FIGS. 3, 4, and 5, the inner circumferential-side support member 53 includes a coupling hole 55 formed in a central portion thereof, and a coupling section 56 formed at an inner circumferential side portion thereof. As shown in FIGS. 3, 4, 5, and 6, the inner circumferential-side support member 53 is fitted over the threshing cylinder support shaft 19 via the coupling hole 55, and is supported by the threshing cylinder support shaft 19 in a relatively non-rotatable manner as a result of the coupling section 56 being coupled to the threshing cylinder support shaft 19 by welding. As shown in FIGS. 3, 4, and 5, the outer circumferential shape of the inner circumferential-side support member 53 is formed in a four-sided shape as a non-perfect circular shape, and support sections 57 are formed at four locations of the outer circumferential side portion of the inner circumferential-side support member 53 in the circumferential direction. As shown in FIG. 6, the coupling section 56 extends from the support sections 57 toward the threshing cylinder support shaft 19, and is formed in a shape expanding toward two welded portions W separated from each other in a direction extending along the axis of the threshing cylinder support shaft 19. The coupling between the coupling section 56 and the threshing cylinder support shaft 19 by welding is performed over a wide range in the axis direction of the threshing cylinder support shaft 19, and the inner circumferential-side support member 53 is firmly supported by the threshing cylinder support shaft 19. In the present embodiment, the coupling section 56 is formed by plate materials overlapping each other in the direction extending along the threshing cylinder support shaft 19. Bifurcated portions formed by bulging portions of the two plate members forms a shape expanding toward the two welded portions W.

As shown in FIGS. 3, 4, and 5, a through-hole 58 through which the inner circumferential-side support member 53 can be passed and that has a four-sided shape similar to the outer circumferential shape of the inner circumferential-side support member 53 is formed in a central portion of the outer circumferential-side support member 54. Fixed sections 59 are formed at four locations of an inner circumferential side portion of the outer circumferential-side support member 54 in the circumferential direction. The four fixed sections 59 are provided at the outer circumferential-side support member 54 at portions that the four support sections 57 of the inner circumferential-side support member 53 respectively overlap in a state in which the inner circumferential-side support member 53 is passed through the through-hole 58, and the inner circumferential-side support member 53 and the outer circumferential-side support member 54 are rotated relative to each other with the axis of the threshing cylinder as the rotation center.

In each of the first intermediate support member 43a, the second intermediate support member 43b, and the third intermediate support member 43c, the fixed sections 59 are coupled to the support sections 57 in order for the outer circumferential-side support member 54 to be supported by the inner circumferential-side support member 53, and this coupling is achieved by performing the following coupling operation.

The threshing cylinder support shaft 19 and the outer circumferential-side support member 54 are moved relative to each other in the front-rear direction. That is, the inner circumferential-side support member 53 and the outer circumferential-side support member 54 are moved relative to each other such that the inner circumferential-side support member 53 passes through the through-hole 58 of the outer circumferential-side support member 54 from the rear side to the front side. Once the inner circumferential-side support member 53 is located on the front side of the outer circumferential-side support member 54, the inner circumferential-side support member 53 and the outer circumferential-side support member 54 are rotated relative to each other so as to cause the four support sections 57 of the inner circumferential-side support member 53 and the four fixed sections 59 of the outer circumferential-side support member 54 to respectively overlap. By fixing the fixed sections 59 to the support sections 57 by attaching coupling bolts to the support sections 57 and the fixed sections 59 that respectively overlap, the outer circumferential-side support member 54 is coupled to the inner circumferential-side support member 53.

When the outer circumferential-side support member 54 is removed from the inner circumferential-side support member 53, the removing operation is performed by reversing the procedure of the coupling operation.

Regarding Configuration of Front Support Member 41:

As shown in FIG. 2, the front support member 41 includes an inner circumferential-side support member 60 that is supported by the threshing cylinder support shaft 19, and an outer circumferential-side support member 61 that is removably supported by the inner circumferential-side support member 60 and that supports the front-side divided threshing teeth support members 45a at its outer circumferential side portion.

Specifically, the inner circumferential-side support member 60 has the same structure as that of the inner circumferential-side support member 53 of the intermediate support member 43. A circular through-hole through which the threshing cylinder support shaft 19 is passed and that has a hole diameter smaller than the outer diameter of the inner circumferential-side support member 53 is formed in a central portion of the outer circumferential-side support member 61. The inner circumferential-side support member 60 and the outer circumferential-side support member 61 are coupled using coupling bolts in a state in which a portion of the inner circumferential-side support member 60 located on the central side of the coupling section 56 is placed into the through-hole of the outer circumferential-side support member 61, and an outer circumferential portion of the inner circumferential-side support member 60 is abutted against the rearward-facing side surface of the outer circumferential-side support member 61.

Regarding Configuration of Rear Support Member 42:

As shown in FIG. 2, the rear support member 42 includes an inner circumferential-side support member 62 that is supported by the threshing cylinder support shaft 19, and an outer circumferential-side support member 63 that is removably supported by the inner circumferential-side support member 62 and that supports the rear-side divided threshing teeth support members 45b at its outer circumferential side portion.

Specifically, the inner circumferential-side support member 62 is fitted over the threshing cylinder support shaft 19 via a coupling hole formed in its central portion, and is welded to the threshing cylinder support shaft 19 in the periphery of the coupling hole. The outer circumferential shape of the inner circumferential-side support member 62 is formed in a circular shape. A through-hole through which the threshing cylinder support shaft 19 is passed and that has a hole diameter smaller than the outer diameter of the inner circumferential-side support member 62 is formed in a central portion of the outer circumferential-side support portion 63. The inner circumferential-side support member 62 and the outer circumferential-side support member 63 are coupled using coupling bolts in a state in which an outer circumferential portion of the inner circumferential-side support member 62 is abutted against the forward-facing side surface of the outer circumferential-side support member 63.

Figure 7:
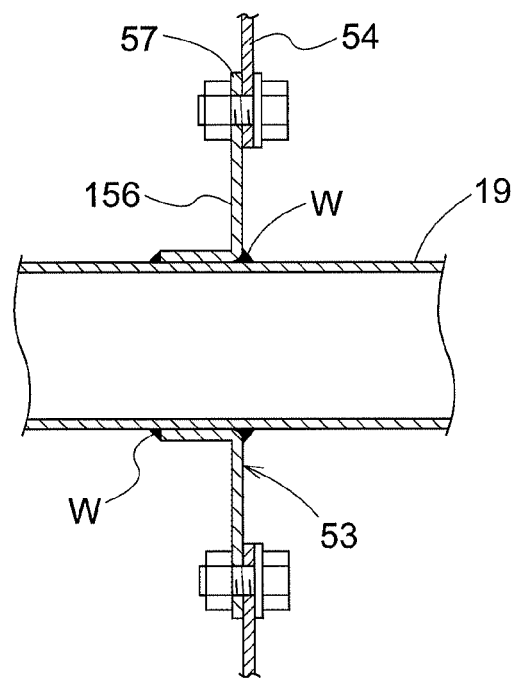
FIG. 7 is a cross-sectional view showing a coupling section having an alternative implementation structure.

Alternative Embodiments (1) FIG. 7 is a cross-sectional view showing a coupling section 156 having an alternative implementation structure.

In the coupling section 156 having the alternative implementation structure, a bent portion is provided at the central portion of the inner circumferential-side support member 53, whereby the coupling section 156 is formed in a shape expanding from the support sections 57 toward two welded portions W separated from each other in a direction extending along the threshing cylinder support shaft 19.

Figure 8:
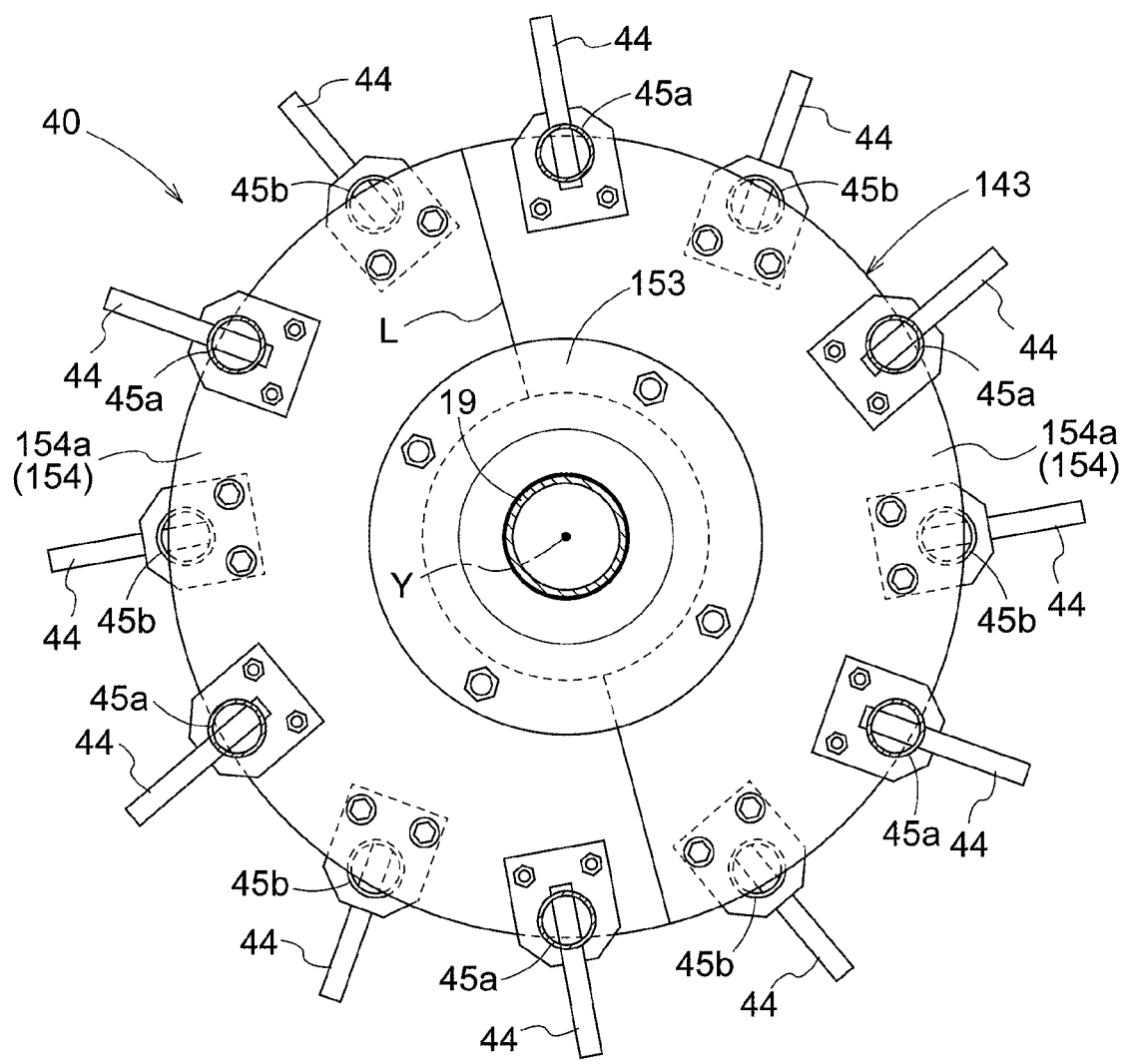
FIG. 8 is a front view showing an intermediate support member having an alternative implementation structure.

(2) FIG. 8 is a front view showing an intermediate support member 143 having an alternative implementation structure. The intermediate support member 143 having the alternative implementation structure includes an inner circumferential-side support member 153 that is supported by the threshing cylinder support shaft 19, and an outer circumferential-side support member 154 that is removably supported by the inner circumferential-side support member 153 and that supports the front-side divided threshing teeth support members 45a and the rear-side divided threshing teeth support members 45b.

The outer circumferential-side support member 154 is configured to be able to be divided in the radial direction of the threshing processing section 40. Specifically, the outer circumferential-side support member 154 is configured to be able to be divided into two divided outer circumferential-side support members 154a by a dividing line L. When the outer circumferential-side support member 154 is configured to be able to be divided in this manner in the intermediate support member 143, the outer circumferential-side support member is also configured to be able to be divided in the radial direction of the threshing processing section 40 in the front support member 41 and the rear support member 42 as well. In each of the front support member 41, the intermediate support member 143, and the rear support member 42, the outer circumferential-side support member 154 can be removed from the inner circumferential-side support member 153 from the outer side in the radial direction of the threshing processing section 40, or be attached to the inner circumferential-side support member 153 from the outer side in the radial direction of the threshing processing section 40 in a state in which the outer circumferential-side support member 154 is divided into the divided outer circumferential-side support members 154a.

Figure 9:
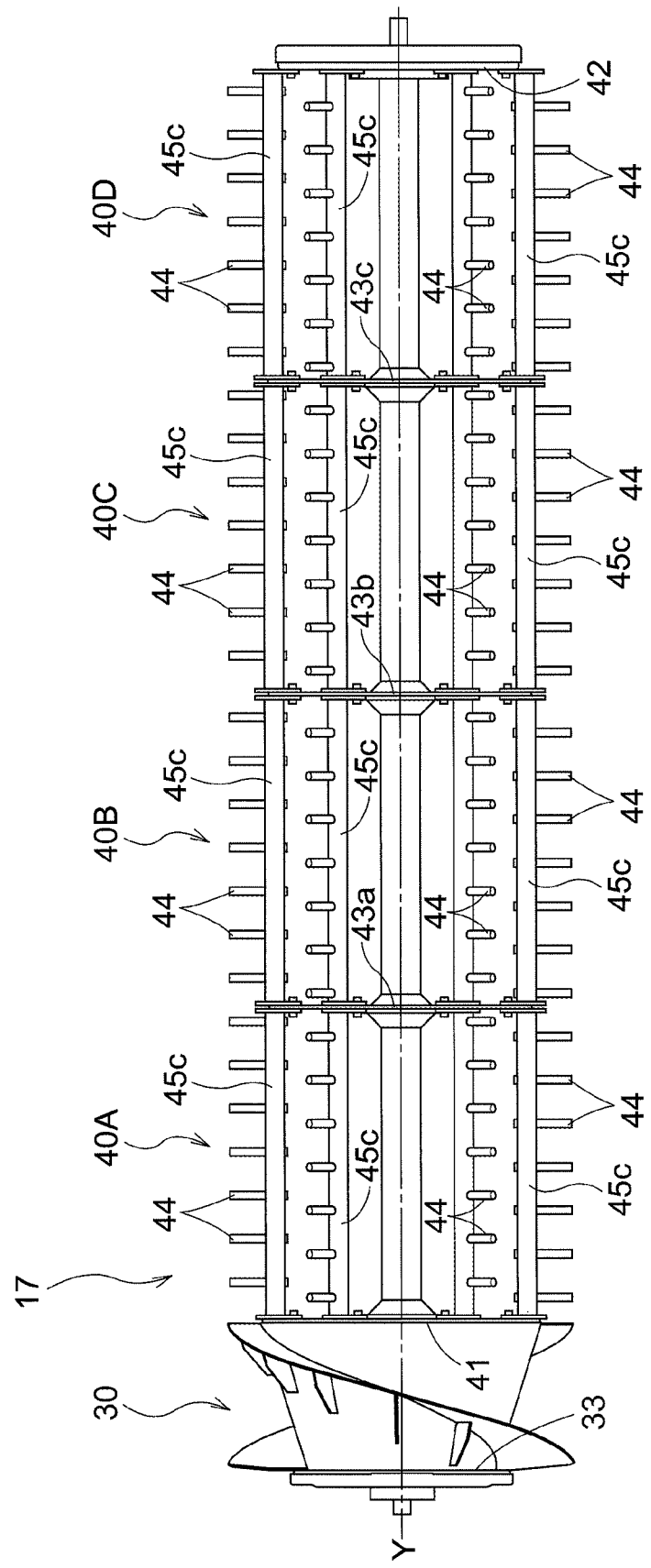
FIG. 9 is a side view showing a threshing cylinder having an alternative implementation structure.

(3) FIG. 9 is a side view showing a threshing cylinder having an alternative implementation structure. In a threshing cylinder 17 having the alternative implementation structure, the threshing processing section 40 includes a first threshing processing section 40A including six divided threshing teeth support members 45c located between the front support member 41 and the first intermediate support member 43a, a second threshing processing section 40B including six divided threshing teeth support members 45c located between the first intermediate support member 43a and the second intermediate support member 43b, a third threshing processing section 40C including six divided threshing teeth support members 45c located between the second intermediate support member 43b and the third intermediate support member 43c, and a fourth threshing processing section 40D including six divided threshing teeth support members 45c located between the third intermediate support member 43c and the rear support member 42.

The divided threshing teeth support members 45c of the first threshing processing section 40A, the divided threshing teeth support members 45c of the second threshing processing section 40B, the divided threshing teeth support members 45c of the third threshing processing section 40C, and the divided threshing teeth support members 45c of the fourth threshing processing section 40D are each formed by dividing, in the front-rear direction, a single threshing teeth support member having a front-to-rear length spanning the front support member 41 and the rear support member 42, at positions respectively corresponding to the three intermediate support members 43a, 43b, and 43c. As shown in FIG. 9, the divided threshing teeth support members 45c that have been divided into four from each single threshing teeth support member are arranged linearly so as to be located on the same axis.

Figure 10:
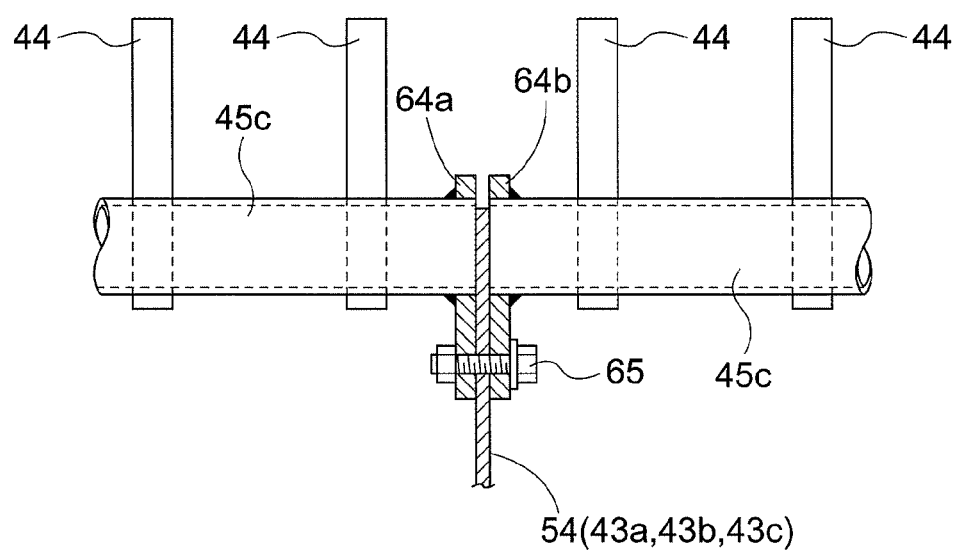
FIG. 10 is a cross-sectional view showing a support structure for divided threshing teeth support members in a threshing cylinder having an alternative implementation structure.

Each of the four linearly arranged divided threshing teeth support members 45c is supported by the corresponding one of the three intermediate support members 43a, 43b, and 43c based on the support structure shown in FIG. 10.

That is, as shown in FIG. 10, each of the divided threshing teeth support members 45c located forward of the intermediate support member 43a, 43b, or 43c includes a coupling bracket 64a at its rear end portion as an end portion corresponding to the intermediate support member 43a, 43b, or 43c. Each of the divided threshing teeth support members 45c located rearward of the intermediate support member 43a, 43b, or 43c includes a coupling bracket 64b at its front end portion as an end portion corresponding to the intermediate support member 43a, 43b, or 43c. In the present embodiment, each of the divided threshing teeth support members 45c and the coupling bracket 64a or 64b are coupled by welding. The means for coupling is not limited to welding, and it is possible to adopt various means such as a coupling bolt and an adhesive. The coupling bracket 64a of each of the divided threshing teeth support members 45c on the front side and the coupling bracket 64b of each of the threshing teeth support members 45c on the rear side are provided on the divided threshing teeth support member 45c for the intermediate support members 43a, 43b, or 43c in a state in which the coupling brackets 64a and 64b sandwich an outer circumferential portion of the outer circumferential-side support member 54 of the intermediate support members 43a, 43b, or 43c. The two coupling brackets 64a and 64b are fastened together and coupled to the outer circumferential-side support member 54 using a coupling bolt 65.

(4) Although an example in which the threshing teeth support member is divided into the divided threshing teeth support members 45a, 45b, and 45c is shown, the threshing teeth support member does not need to be divided.

(5) The above-described embodiment shows an example in which a four-sided shape is adopted as the non-perfect circular shape of the outer circumferential shape of the inner circumferential-side support member 53 and the shape of the through-hole 58 of the outer circumferential-side support member 54; however, the present invention is not limited thereto. For example, it is possible to adopt a rectangular shape, a polygonal shape, an oblong shape, or an oval shape.

(6) The above-described embodiment shows an example in which the front-side divided threshing teeth support member 45a and the rear-side divided threshing teeth support member 45b are configured to have equal lengths in the front-rear direction; however, the present invention is not limited thereto. For example, the front-side divided threshing teeth support member 45a and the rear-side divided threshing teeth support member 45b may be configured to have different lengths, for example, by setting the position corresponding to the first intermediate support member 43a or the position corresponding to the third intermediate support member 43c at a location where the threshing teeth support member is divided.

(7) The above-described embodiment shows an example in which three intermediate support members 43 are provided; however, two or less, or four or more intermediate support members 43 may be provided.

(8) The above-described embodiment shows an example in which each of the front support member 41, the intermediate support member 43, and the rear support member 42 is configured to be able to be divided into an inner circumferential-side support member and an outer circumferential-side support member; however, they may be configured to be indivisible.

(9) The above-described embodiment shows an example in which a front support member 41, an intermediate support member 43, and a rear support member 42 that are coupled to the threshing cylinder support shaft 19 by welding is adopted; however, the present invention is not limited thereto, and the front support member 41, the intermediate support member 43, and the rear support member 42 may be coupled to the threshing cylinder support shaft 19 using coupling bolts or the like. In the case where the support members are coupled by welding, the coupling section is not limited to the one having a shape expanding toward two welded portions, and may have any shape.

(10) The above-described embodiment shows an example in which a rear support member 42 having an outer diameter smaller than the outer diameter of the intermediate support member 43 is adopted; however, the present invention is not limited thereto. For example, the outer diameter of the intermediate support member and the outer diameter of the rear support member may be equal, or the outer diameter of the rear support member may be larger than the outer diameter of the intermediate support member.

INDUSTRIAL APPLICABILITY

The present invention is not limited to a threshing cylinder including only a bar-shaped threshing processing section in addition to a raking section, and is applicable to a threshing cylinder including a drum-shaped threshing processing section and a rasp threshing teeth-type threshing processing section in conformity with the bar-shaped threshing processing section.

DESCRIPTION OF REFERENCE SIGNS

18: Threshing chamber
19: Threshing cylinder support shaft
30: Raking section
40: Threshing processing section
41: Front support member
42: Rear support member
43*b*: Intermediate support member
44: Threshing teeth
45*a*: Front-side divided threshing teeth support member
45*b*: Rear-side divided threshing teeth support member
45*c*: Divided threshing teeth support member
46*a*: Arrangement pitch
46*b*: Arrangement pitch
53: Inner circumferential-side support member of intermediate support member
54: Outer circumferential-side support member of intermediate support member
56: Coupling section
57: Support section
58: Through-hole
59: Fixed section
60: Inner circumferential-side support member of front support member
61: Outer circumferential-side support member of front support member
156: Coupling section
143: Intermediate support member
153: Inner circumferential-side support member

The invention claimed is:

1. A threshing cylinder comprising:
   a threshing cylinder support shaft that is rotatably provided in a threshing chamber into which the entirety of harvested crops is fed, so as to be oriented along a front-rear direction of the threshing chamber;
   a raking section that is supported by a front portion of the threshing cylinder support shaft and that rakes the fed crops toward a rear of the threshing chamber; and
   a threshing processing section that is supported by a portion of the threshing cylinder support shaft located rearward of the raking section and that performs threshing processing on the crops raked by the raking section,
   wherein the threshing processing section comprises:
      a front support member that is supported by the threshing cylinder support shaft;
      a rear support member that is supported by a portion of the threshing cylinder support shaft located rearward of the front support member;
      an intermediate support member that is supported by a portion of the threshing cylinder support shaft located between the front support member and the rear support member;
      a plurality of bar-shaped threshing teeth support members that are supported by the front support member, the intermediate support member, and the rear support member in a state in which the threshing teeth support members extend along the threshing cylinder support shaft and are spaced in a circumferential direction of the threshing processing section; and
      a plurality of bar-shaped threshing teeth that are supported by each of the plurality of threshing teeth support members in a state in which the threshing teeth protrude outward in a radial direction of the threshing processing section from the threshing teeth support member and are spaced in a direction extending along the threshing cylinder support shaft,
   wherein each of the plurality of threshing teeth support members is divided into a front-side divided threshing teeth support member located forward of the intermediate support member, and a rear-side divided threshing teeth support member located rearward of the intermediate support member, and
   wherein in a circumferential direction of the threshing processing section, the plurality of front-side divided threshing teeth support members have the same arrangement pitch, the plurality of rear-side divided threshing teeth support members have the same arrangement pitch, and an arrangement of the front-side divided threshing teeth support members and an arrangement of the rear-side divided threshing teeth support members are different, and in the circumferential direction of the threshing processing section, all intervals between the front-side divided threshing teeth support member and the rear-side divided threshing teeth support member adjacent thereto are equal.

2. The threshing cylinder according to claim 1, wherein the front-side divided threshing teeth support members and the rear-side divided threshing teeth support members have an equal length in a front-rear direction of the threshing cylinder, and
   wherein the front-side divided threshing teeth support members and the rear-side divided threshing teeth support members are interchangeable.

3. The threshing cylinder according to claim 1, wherein each of the front support member, the intermediate support member, and the rear support member includes an inner circumferential-side support member that is welded to the threshing cylinder support shaft, and an outer circumferential-side support member that is removably supported by the inner circumferential-side support member and that supports the threshing teeth support members.

4. The threshing cylinder according to claim 3, wherein, in the intermediate support member:
   a support section that supports the outer circumferential-side support member is provided at an outer circumferential side portion of the inner circumferential-side support member, and
   a coupling section that is coupled to the threshing cylinder support shaft by welding is provided at an inner circumferential side portion of the inner circumferential-side support member, and
   wherein the coupling section is formed in a shape expanding from the support section toward two welded portions that are separated from each other in a direction extending along the threshing cylinder support shaft.

5. The threshing cylinder according to claim 4, wherein the outer circumferential-side support member has a through-hole through which the threshing cylinder support shaft and the inner circumferential-side support member are passed,
   wherein an outer circumferential shape of the inner circumferential-side support member and a shape of the through-hole are formed in non-perfect circular shapes similar to each other, and
   wherein a fixed section that is fixed to the support section is provided at a portion of the outer circumferential-side support member that overlaps the support section in a state in which the inner circumferential-side support member is passed through the through-hole, and the inner circumferential-side support member and the outer circumferential-side support member are rotated relative to each other.

6. The threshing cylinder according to claim 3, wherein the outer circumferential-side support member is configured to be able to be divided in the radial direction of the threshing processing section in the front support member, the intermediate support member, and the rear support member.

7. The threshing cylinder according to claim 1, wherein an outer diameter of the rear support member is smaller than an outer diameter of the intermediate support member.

8. The threshing cylinder according to claim 2, wherein each of the front support member, the intermediate support member, and the rear support member includes an inner circumferential-side support member that is welded to the threshing cylinder support shaft, and an outer circumferential-side support member that is removably supported by the inner circumferential-side support member and that supports the threshing teeth support members.

9. The threshing cylinder according to claim 4, wherein the outer circumferential-side support member is configured to be able to be divided in the radial direction of the threshing processing section in the front support member, the intermediate support member, and the rear support member.

* * * * *